United States Patent [19]
Ahlgrim

[11] Patent Number: 5,099,366
[45] Date of Patent: Mar. 24, 1992

[54] LOW FREQUENCY RESTORER

[75] Inventor: Steven P. Ahlgrim, Redwood City, Calif.

[73] Assignee: Ampex Corporation, Redwood City, Calif.

[21] Appl. No.: 399,666

[22] Filed: Aug. 25, 1989

[51] Int. Cl.$^5$ .............................................. G11B 5/02
[52] U.S. Cl. ...................................... 360/67; 360/46
[58] Field of Search ............................. 360/46, 65, 67

[56] References Cited

U.S. PATENT DOCUMENTS

| | | |
|---|---|---|
| 2,550,178 | 4/1951 | Wendt . |
| 2,572,179 | 10/1951 | Moore . |
| 2,709,200 | 5/1955 | Johnson . |
| 3,435,252 | 3/1969 | Eubanks . |
| 3,543,169 | 11/1970 | Hill . |
| 3,605,018 | 9/1971 | Coviello . |
| 3,670,100 | 6/1972 | Briggs et al. . |
| 3,777,056 | 12/1973 | Pieters . |
| 3,885,093 | 5/1975 | Mooney . |
| 3,906,384 | 9/1975 | Schiffman . |
| 3,936,760 | 2/1976 | Rosen . |
| 4,110,798 | 8/1978 | Miller et al. . |
| 4,122,492 | 10/1978 | Gallo . |
| 4,125,812 | 11/1978 | Polonio . |
| 4,214,271 | 7/1980 | Jones et al. . |
| 4,296,437 | 10/1981 | Geurts . |
| 4,914,528 | 4/1990 | Aoki et al. ............................. 360/46 |
| 4,972,276 | 11/1990 | Wadaya et al. ....................... 360/46 |
| 4,991,034 | 2/1991 | Sato ...................................... 360/67 |

FOREIGN PATENT DOCUMENTS 866943 5/1961 United Kingdom .

OTHER PUBLICATIONS

"Equalization of the D.C. Null in High Density Digital Magnetic Recording," by W. D. Huber, pp. 37–10.

Primary Examiner—David J. Severin
Attorney, Agent, or Firm—Rodney L. Marett; Elizabeth E. Strnard

[57] ABSTRACT

The low frequency restorer of the invention restores the DC and low frequency contents to a digital signal which has been submitted to magnetic recording, playback and equalization processes. The restorer first provides a coarse representation of the originally recorded digital signal by clamping and subsequently hard limiting the equalized signal. The hard limited signal is then low pass filtered and the resulting signal, which is an approximation of the missing DC and low frequency components, is utilized as a correction signal, which is summed with the equalized signal, to restore the missing components. An alternative embodiment further eliminaes low frequency cross talk from the equalized signal by high pass filtering the equalized signal and low pass filtering the correction signal prior to summing.

7 Claims, 3 Drawing Sheets

LOW FREQUENCY RESTORER

The invention relates generally to low frequency and DC level restoration, and more particularly, to an apparatus for restoring the low frequency and DC contents to a digital signal which has been subjected to magnetic recording, playback, and equalization processes.

BACKGROUND OF THE INVENTION

Signals subjected to magnetic recording and playback process are generally distorted because of the well known nonlinear frequency response of the recording/playback channel. Particularly when a digital signal is recorded and reproduced, it may be attenuated and distorted to such extent that the reproduced signal does not provide sufficient information about the originally recorded signal, nor does it provide distinct zero crossovers necessary for accurate detection of a self clocking signal. The signal distortion is due in part to the inductive nature of the playback head and to spacing losses. The inductance of the playback head prevents recovery of low frequencies in the signal played back from the recording medium. As it is well known, the playback signal is a function of the first time derivative of the recorded flux. Therefore, DC level and low frequency changes are not fully represented in the playback signal. On the other hand, spacing loss, which is a playback signal loss due to a nonzero distance between the playback head and the recording medium, contributes to high frequency attenuation. To compensate for both low and high frequency losses, it is generally known to use signal equalizers providing a substantially flat frequency response in the playback channel.

One known playback signal equalizer utilized in a digital magnetic recording/reproducing channel is described in the commonly assigned U.S. Pat. No. 4,110,798 to Miller et al. It has a low pass integrating circuit and a high pass differentiating circuit connected in parallel. The integrator provides an output signal which lags the input signal by 90°, and an output signal from the differentiator leads the input signal by 90°. These respective output signals, which are equal in magnitude but of opposite polarity, are algebraically combined. The resulting equalized playback signal has a desired nearly flat frequency response.

The above-described type of equalizer has a disadvantage that the resulting equalized signal lacks DC and low frequency information. This leads to a non-constant average DC level, generally referred to as "baseline wander". The baseline wander is known to be caused by the loss of low frequency content due to the inductive nature of the playback head. The baseline wander appears as low frequency distortion in the equalized playback signal and it may cause misdetection by either shifting the zero crossing position of the bit detection, or by introducing a phase error in the clock synchronization circuit.

The above-described type of equalizer has a further disadvantage related to boosting the low frequency content of the playback data by the integrating channel. For example, in a high track density disk recorder the data detected by the playback head will contain low frequency information from the data track of interest, as well as low frequency crosstalk from adjacent tracks. Thus the equalizer will add unwanted cross talk into the equalized data.

Another type of playback equalizer is described in a publication Equalization Of The D. C. Null In High Density Digital Magnetic Recording, by W. D. Huber, paper 37-10, presented at the 1981 INTERMAG Conference, Grenoble, France, May 12 to 15. The equalizer of this publication partially restores the DC and low frequency content of a digital playback signal by centering the midpoint between the extreme peak amplitudes of the integrated signal. The centering is obtained by clamping and hard limiting the amplitude extremes of the integrated playback signal waveform to obtain positive and negative logic levels. However, the displacement of zero crossings due to baseline wander is not solved by this technique. The resulting processed waveform provides only a coarse representation of the recorded digital signal because it has noisy zero crossings and therefore unreliable clock recovery and data detection.

SUMMARY OF THE INVENTION

The present invention provides an improved apparatus and method for restoring low frequency and DC level contents of a digital signal which has been recorded and is played back from a recording medium and subsequently equalized to have a substantially flat frequency response. The apparatus and method of the invention eliminate the baseline wander while removing zero crossing jitter, as follows.

A crude digital representation of the equalized playback signal is first obtained by clamping and hard limiting, as above-described. The resulting signal is filtered to remove high frequency components. The thusly obtained low frequency component tracks the baseline wander in the playback signal, and it is an approximation of the low frequency and DC components which are missing from the playback signal. That low frequency component is utilized as a correction signal and it is algebraically combined with the equalized playback signal. The resulting combined signal has both the baseline wander as well as zero crossing jitter removed therefrom.

An alternative embodiment of the present invention eliminates a further problem associated with the magnetic recording/playback channel, which problem is particularly related to narrow tracks utilized in high density recording/playback, as follows. Low frequency boosting of the playback signal for equalization purposes is usually accomplished by integration. However, when utilizing a high density storage medium, for example having a track pitch in the order of one mil, integration would boost the low frequency content of the playback signal not only from the desired track, but also from adjacent tracks, due to crosstalk. The alternative embodiment eliminates the above problem as it is indicated below.

A high pass filter is coupled in the equalization signal pass, to eliminate low frequency signal components, including low frequency cross talk. A further, second low pass filter is coupled in the correction signal pass to provide low frequency boost, thereby compensating for the absence of low frequency components removed by the high pass filter.

DETAILED DESCRIPTION

Figure 1:
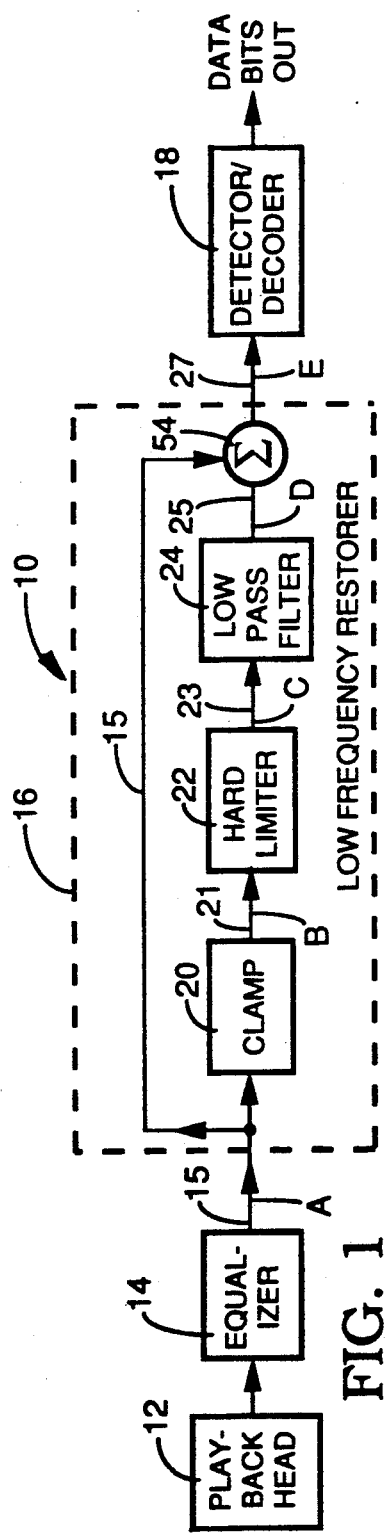
FIG. 1 is a functional block diagram of a magnetic playback channel incorporating a low frequency restorer in accordance with the preferred embodiment of the invention.

It is noted that corresponding circuit elements in all the drawing Figures are designated by corresponding reference characters to facilitate comparison.

FIG. 1 shows an example of a magnetic playback channel 10, having a playback head 12, followed by a frequency response equalizer 14, a low frequency restorer 16 in accordance with the preferred embodiment, and a zero crossing detector/decoder 18. The playback head 12, equalizer 14, and zero crossing detector/decoder 18 are well known in the art of magnetic recording/playback and detection of digital signals, and therefore will not be described in detail. An example of a playback equalizer is described in the previously mentioned commonly assigned U.S. Pat. No. 4,110,798. In that prior art equalizer the equalized signal is applied directly to a zero crossing detector for detection and decoding. However, the equalized signal at the output of equalizer 14, lacks the low frequency and DC information content for the reasons which have been explained above. Without that information the equalized signal exhibits the above-described baseline wander, which in turn causes jitter in zero crossing and resulting errors in the data detection provided by the detector/decoder 18.

The low frequency restorer 16 of the present invention restores the missing low frequency and DC content of the equalized digital signal, as it will be described below. With further reference to FIG. 1, the low frequency restorer 16 comprises a clamping circuit or clamp 20, followed by a hard limiter 22 and a low pass filter 24. The output signal from the low pass filter 24 on line 25 is algebraically combined with the output signal on line 15 of equalizer 14 by a summing circuit 54. The resulting summed signal on line 27 is applied to the zero crossing detector/decoder 18 for data detection and decoding.

Figure 4A:
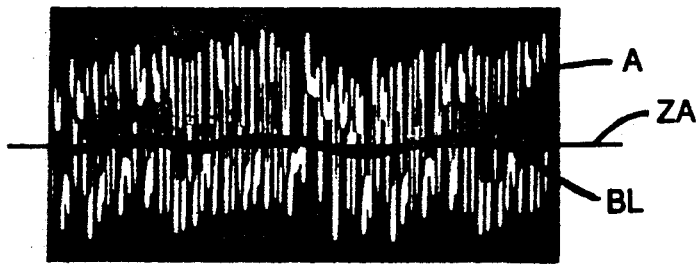
FIGS. 4A to 4E are examples of graphic illustrations of waveforms occurring at various locations in the circuit of FIGS. 1, 2 and 3.
Figure 4B:

Now the operation of the preferred embodiment shown in FIG. 1 will be described with reference to the waveforms illustrated as an example in FIGS. 4A to 4E. An example of an equalized playback signal waveform A on line 15 is shown in FIG. 4A. As it is seen, the baseline BL of that waveform is not a straight line corresponding to the zero axis ZA. Instead, the baseline BL in FIG. 4A is affected by the lack of low frequency information resulting in baseline wander as above-described. The signal A on line 15 is applied to the clamping circuit 20 which clamps that signal at a maximum peak level which is obtained after any positive going transition, and at a minimum peak level obtained after any negative going transition. FIG. 4B shows an example of the clamped signal waveform B occurring on line 21 in FIG. 1. As it is seen from the comparison of the waveforms of FIGS. 4A to 4E, the waveforms in FIGS. 4B to 4D have their time scale expanded for better clarity of representation.

Figure 2:
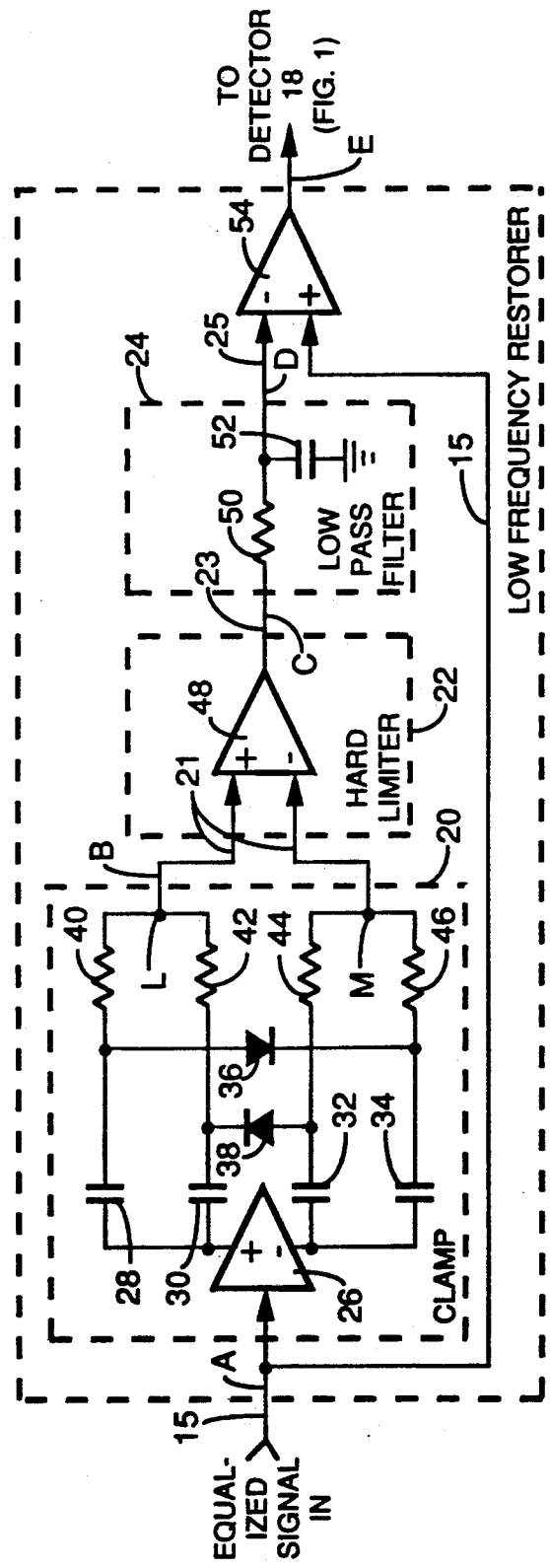
FIG. 2 is a more detailed schematic diagram corresponding to the block diagram of FIG. 1.
Figure 4C:
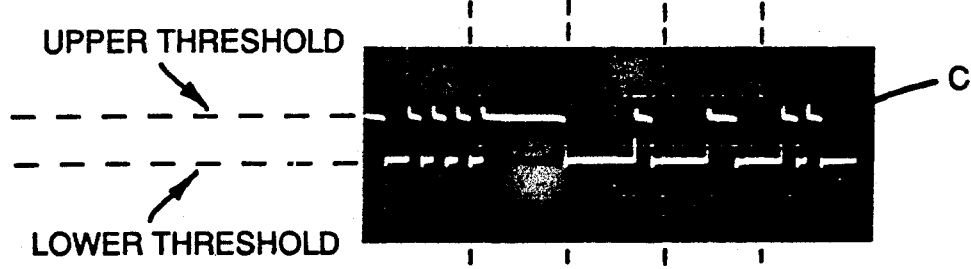
Figure 4D:
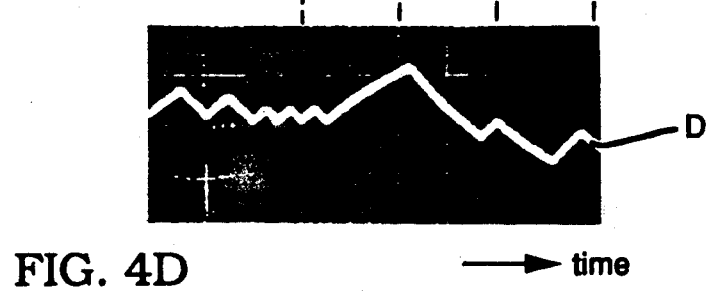

The clamped signal B on line 21 is applied to the hard limiter 22 which limits the clamped signal to an upper and lower threshold level, as it is shown by the waveform C in FIG. 4C. The hard limited signal C on line 23 is applied to low pass filter 24, which in the preferred embodiment is implemented by an integrator, as it is shown in FIG. 2. The integrated signal D on line 25 from the low pass filter 24 is shown in FIG. 4D. Signal D approximately follows the baseline wander of signal A shown in FIG. 4A. Note that waveform D is shown with an expanded time scale with respect to waveform A. Thus, the low frequency signal D on line 25 of FIG. 1 tracks the baseline wander of the equalized signal A on line 15.

In accordance with a particular feature of the invention, signal D on line 25 is utilized as a correction signal, to eliminate the baseline wander in the equalized signal A as follows. The summing circuit 54 combines the signal D on line 25 with signal A on line 15, and applies the resulting summed signal E on line 27 to the zero crossing detector/decoder 18. As it is seen from FIG. 4E, the thusly obtained signal E has its baseline BL represented by a substantially straight line, which corresponds to the zero axis ZA. From the comparison of the waveform A of FIG. 4A and waveform E of FIG. 4E follows that the resulting signal waveform on line 27 at the output of the summing circuit 54 has the baseline wander eliminated therefrom and it corresponds to the originally recorded and played back data which has its low frequency and DC content restored. The thusly restored signal E on line 27 does not suffer from zero crossing jitter due to baseline wander and therefore the accuracy of data detection by the zero crossing detector/decoder 18 is substantially improved.

Now a more detailed description of the preferred embodiment and its operation will be given with reference to the detailed circuit diagram of FIG. 2.

Clamp 20, preferably implemented as a differential clamp, includes a phase splitter amplifier 26, capacitors 28, 30, 32 and 34, a pair of diodes 36 and 38 and resistors 40, 42, 44 and 46.

The equalized signal is applied to the phase splitter amplifier 26 which "splits" the equalized signal into a noninverted equalized output signal at its noninverting (+) output and an inverted equalized signal at its inverting (−) output. Capacitor 28 is coupled between the noninverting output of amplifier 26 and the anode of diode 36, and capacitor 34 is coupled between the inverting output of amplifier 26 and the cathode of diode 36. Capacitor 30 is coupled between the noninverting output of amplifier 26 and the cathode of diode 38, and capacitor 32 is coupled between the inverting output of amplifier 26 and the anode of diode 38.

The purpose of the differential clamping circuit 20 is to limit the extremes of the signal A on line 15 and to center the zero crossings of the signal around zero potential before hard limiting. After phase splitting four signal paths are generated, that is two differential signal paths for each phase. Each signal path has a DC blocking capacitor 28, 30, 32, 34 respectively. The diodes 36, 38 are driven differentially, so that for positive going signals at the noninverting output of amplifier 26 diode 36 conducts while the other diode 38 remains reverse biased. The conducting diode 36 effectively shorts two signal paths causing them to assume the same potential. Since the circuit is differential and the shorted points have no difference in potential, they are effectively clamped to zero potential. The other diode 38, arranged in the opposite phase is not conducting for the above-mentioned positive going signals. Thus diode 38 allows the other two differential signal paths, to which it is connected, to pass the above-mentioned positive going output signals from amplifier 26. The above-described operation of diodes 36, 38 is reversed for a negative going signal at the noninverting output of amplifier 26.

The anode of diode 36 and the cathode of diode 38 are connected by resistors 40 and 42 such that the voltage at the node L between resistors 40 and 42 is the average of the voltages appearing at the anode of diode 36 and the cathode of diode 38. Similarly, the anode of diode 38 and the cathode of diode 36 are connected by resistors 44 and 46 such that the voltage appearing at the node M between resistors 44 and 46 is the average of the voltages at, the anode of diode 38 and the cathode of diode 36. These average voltages provided by resistors 44 and 42, and by resistors 44 and 46, are equal in magnitude but opposite in polarity. These voltages correspond to the differentially clamped waveform B shown in FIG. 4B.

The thusly clamped noninverted and inverted signals at the nodes L and M are applied to hard limiter 22. Hard limiter 22 has a voltage comparator 48 which saturates to limit its output signal to an upper and a lower threshold. Thus, the noninverted and inverted signals are differentially compared by comparator 48 and the resultant amplified signal is clipped at an upper and a lower threshold. As hereinabove described, the hard limited signal C provided by comparator 48 is shown in FIG. 4C and it is a coarse representation of the original digital signal which has been recorded on the magnetic medium.

The hard limited signal C on line 23 is applied to low pass filter 24 which has a series resistor 50 and a parallel capacitor 52, which determine the time constant t1 of low pass filter 24. Preferably, the time constant t1 is chosen to approximate the time constant of the combined characteristics of the playback head 12 and the integrating channel of equalizer 14 of FIG. 1. The thusly obtained correction signal D on line 25 at the output from low pass filter 24 is an approximation of the DC and low frequency signal components of the original data waveform, as previously described.

Figure 4E:
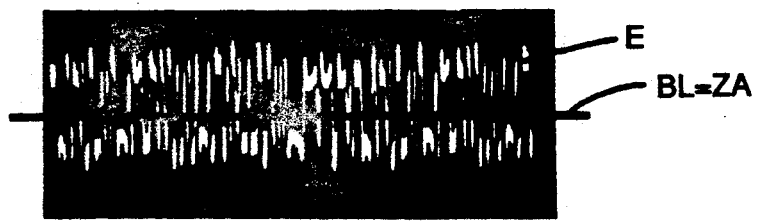

In the preferred embodiment the summing circuit 54 is implemented by a differential amplifier. The low frequency correction signal D on line 25 is applied to the inverting input of amplifier 54 and the equalized signal on line 15 is applied to the noninverting input of amplifier 54. In this example, the low frequency correction signal and the equalized signal are summed with different polarities. The resulting summed signal E at the output from amplifier 54 is shown in FIG. 4E. It is the equalized playback signal which has its DC and low frequency content restored. As it is seen from FIG. 4E, the baseline BA of signal E is a substantially straight line corresponding to the zero axis ZA. The signal E on line 27 is applied to detector/decoder 18 for decoding, as previously described.

Figure 3:
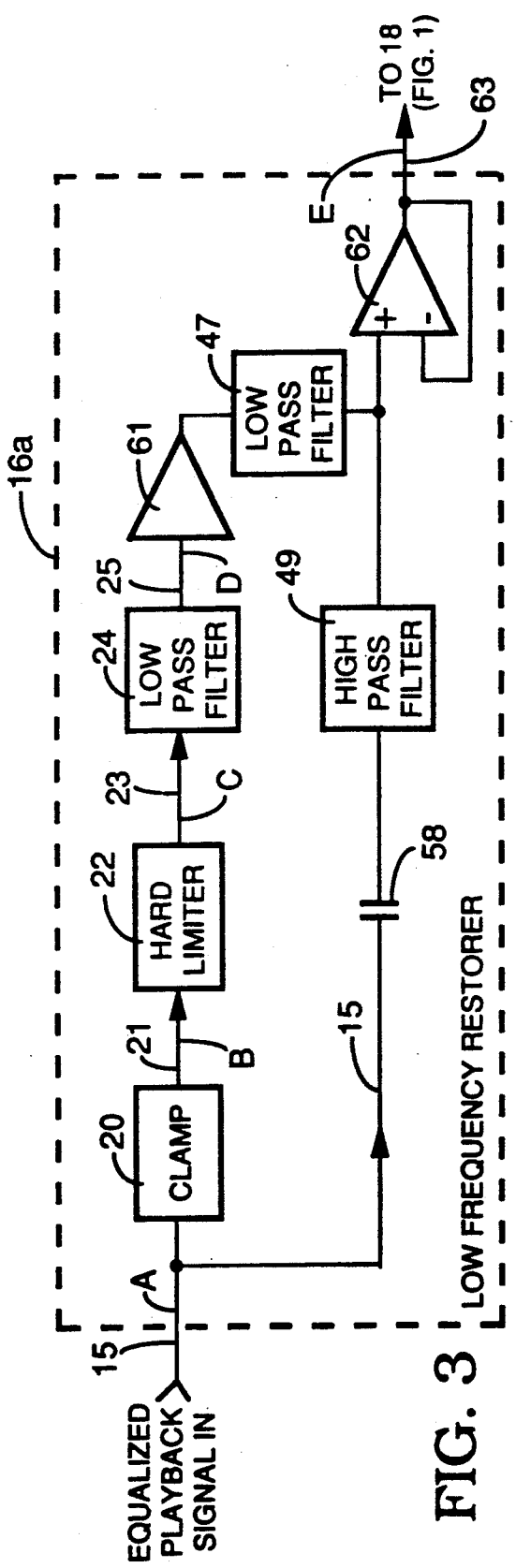
FIG. 3 is a functional block diagram of an alternative embodiment of the invention.

FIG. 3 shows an alternative embodiment of a low frequency restorer 16a of the invention. The low frequency restorer 16a has a clamping circuit 20, hard limiter 22, and low pass filter 24, corresponding to those above-described with reference to FIGS. 1 or 2. However, in addition, it includes a high pass filter 49 coupled in the equalization signal pass on line 15, and a second low pass filter 47 coupled in the correction signal pass on line 25. The high pass filter 49 serves to remove low frequency components which may have been induced in the playback signal as cross talk, for example from closely located adjacent tracks of the magnetic recording medium, and boosted by the integrating channel of equalizer 14. The second low pass filter 47 which terminates the first low pass filter 24, compensates for the low frequency attenuation provided by the high pass filter 49. As hereinabove described, the time constant t1 of low pass filter 24 was selected to approximate the time constant derived from the combined characteristics of the playback head 12 and the integrating channel of the equalizer 14 of FIG. 1. The time constant t2 of the second low pass filter 47 is selected to have the same cutoff frequency as the time constant of the high pass filter 49.

A buffer amplifier 61 is coupled between an output of the first low pass filter 24 and an input of the second low pass filter 47 to transform the impedances between these two devices. As a summing circuit, in this embodiment a voltage follower 62 is utilized. In this example the low pass filtered correction signal at the output of second low pass filter 47 and the high pass filtered equalized signal at the output of high pass filter 49 are summed with the same polarity.

Figure 5:
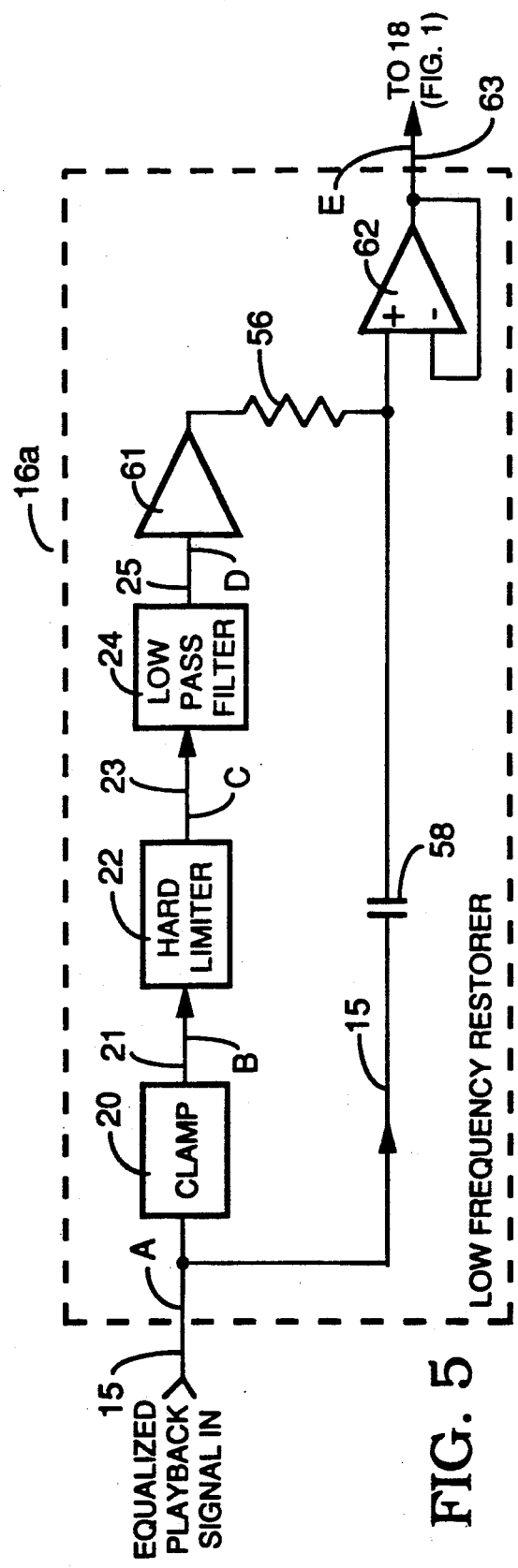
FIG. 5 is a functional block diagram showing a particular example of the embodiment of FIG. 3.

FIG. 5 shows a particular implementation of the second low pass filter 47, and the high pass filter 49 of FIG. 3, for applications when the low frequency restorer 16a is driven by a low impedance source, such as equalizer 14 of FIG. 1, and it drives a high input impedance device, such as a voltage follower 62. In this particular embodiment the output of amplifier 61 is coupled via a resistor 56 to the input of voltage follower 62. The equalized playback signal on line 15 is coupled via a capacitor 58 to the same input of voltage follower 62.

In this particular embodiment as shown in FIG. 5, the resistor 56 and the capacitor 58 function both as a high pass filter with respect to the equalized signal on line 15 and as a low pass filter with respect to the correction signal on line 25. Both the high pass characteristic and the low pass characteristic of these high pass and low pass filters have substantially the same cutoff frequency since both are defined by the same RC time constant t2 of resistor 56 and capacitor 58.

There has been hereinabove described a novel apparatus and method for restoring DC and low frequency information to a digital signal which has been recorded and played back from a magnetic medium. It is evident that those skilled in the art may now make numerous uses of and modifications to the specific embodiments and methods hereinabove described without deparing from the inventive concepts therein which are limited solely by the scope of the appended claims.

I claim:

1. A low frequency restorer for restoring missing DC and low frequency signal components to a digital signal which has been subjected to magnetic recording, playback and subsequent equalization process, comprising:

means for clamping said equalized signal at a minimum and maximum signal level, respectively, to provide a clamped signal;

means for hard limiting said clamped signal to an upper and lower thereshold level, respectively, to provide a hard limited signal;

low pass filter means for filtering said hard limited signal to obtain a correction signal which is an approximation of said missing signal components; and summing means for summing said equalized signal and said correction signal to provide an equalized signal which has said DC and low frequency components restored.

2. The low frequency restorer of claim 1 wherein said means for clamping comprises a differential clamping circuit.

3. The low frequency restorer of claim 1 wherein said digital signal is played back from a magnetic medium utilizing a playback head providing a playback signal which is a time differential of the recorded flux, and wherein said equalized signal is provided by an equalizer comprising a parallel combination of a low pass integrating circuit and a high pass differentiating circuit, and wherein a time constant of said low pass filter means in said low frequency restorer is selected to correspond to a time constant derived from combined frequency characteristics of said playback head and said low pass integrating circuit.

4. The low frequency restorer of claim 1 further comprising a low pass filter circuit coupled in a path of said correction signal to said summing means, and a high pass filter circuit coupled in a path of said equalized signal to said summing means.

5. The low frequency restorer of claim 4, wherein said summing means comprises a high impedance device, and wherein said low pass filter circuit comprises a resistor coupled in said correction signal path to said summing means, and a capacitor coupled in a path of said equalized signal to said summing means, and wherein said high pass filter circuit comprises the same resistor and capacitor coupled to said summing means.

6. A low frequency restorer for restoring missing DC and low frequency signal components to a digital signal which has been subjected to magnetic recording, playback and subsequent equalization process, and for eliminating low frequency cross talk induced into the equalized signal, comprising;
   a correction signal path having:
   means for differentially clamping said equalized signal at a minimum and maximum signal level, respectively, to provide a differentially clamped signal;
   means for hard limiting said differentially clamped signal to an upper and lower threshold level, respectively, to provide a hard limited signal;
   first low pass filter means for filtering said hard limited signal to provide a correction signal which is an approximation of said missing signal components;
   second low pass filter means for filtering said correction signal;
   said low frequency restorer further comprising and equalized signal path in parallel with said correction signal path, having high pass filter means for filtering said equalized signal; and
   summing means for summing an output signal of said high pass filter means and the output signal of said second low pass filter means to provide an equalized signal with said DC and low frequency components restored and said low frequency cross talk eliminated therefrom.

7. A low frequency restorer for restoring missing DC and low frequency signal components to a digital signal which has been subjected to magnetic recording, playback and subsequent equalization process, and for eliminating low frequency cross talk induced into the equalized signal, comprising:
   means for differentially clamping said equalized signal at a minimum and maximum signal level, respectively, to provide a differentially clamped signal;
   means for hard limiting said differentially clamped signal to an upper and lower thereshold level, respectively, to provide a hard limited signal;
   first low pass filter means for filtering said hard limited signal to provide a correction signal which is an approximation of said missing signal components;
   summing means for summing said equalized signal and said correction signal to provide an equalized signal which has said DC and low frequency components restored;
   a resistor coupled between an output of said first low pass filter means and said summing means; and
   a capacitor coupled in a path of said equalized signal to said summing means, wherein a combination of elements comprising said resistor and capacitor provides a second low pass filter means in a path of said correction signal, and said combination of elements provides a high pass filter means in said equalized signal path.

* * * * *